United States Patent [19]

Inaike et al.

[11] Patent Number: 4,749,748

[45] Date of Patent: Jun. 7, 1988

[54] EPOXY RESIN ADHESIVE COMPOSITION

[75] Inventors: Tosihiro Inaike; Kunio Kido; Takao Matumoto, all of Hirakata, Japan

[73] Assignee: UBE Industries, Ltd., Yamaguchi, Japan

[21] Appl. No.: 828,236

[22] Filed: Feb. 10, 1986

[30] Foreign Application Priority Data

Feb. 12, 1985 [JP] Japan .................................. 60-23599

[51] Int. Cl.$^4$ ............................................. C08G 59/54
[52] U.S. Cl. ..................................................... 525/113
[58] Field of Search ......................................... 525/113

[56] References Cited

U.S. PATENT DOCUMENTS

| | | | |
|---|---|---|---|
| 3,321,432 | 5/1967 | Strasser et al. | 525/113 |
| 4,260,700 | 4/1981 | Cassutt et al. | 525/113 |
| 4,447,579 | 5/1984 | Takagi et al. | 525/113 |

FOREIGN PATENT DOCUMENTS 0030668 6/1981 European Pat. Off. .

OTHER PUBLICATIONS

Chemical Abstracts, vol. 87, 1977, Abstract no. 40320g.

*Primary Examiner*—Veronica P. Hoke
*Attorney, Agent, or Firm*—Burgess, Ryan & Wayne

[57] ABSTRACT

An epoxy resin adhesive composition comprising (A) an epoxy compound having at least two epoxy groups on the average in the molecule and (B) a reaction product obtained by reacting an aliphatic polyamine compound represented by the general formula $H_2N(CH_2CH_2NH)_nH$, in which n is 2 to 5, with a diene type liquid rubber having a terminal carboxyl group and a molecular weight of 1,000 to 7,000 so that the molar ratio of the aliphatic polyamine compound to the diene type liquid rubber is in the range of from 5 to 100.

7 Claims, No Drawings

EPOXY RESIN ADHESIVE COMPOSITION

BACKGROUND OF THE INVENTION

1. Field of the Invention

The present invention relates to an adhesive composition comprising an epoxy compound and a reaction product of an aliphatic polyamine with a diene type liquid rubber having a terminal carboxyl group, which is valuable for bonding of FRP and is excellent in the tensile shear strength at relatively high temperatures.

2. Description of the Related Art

Structural adhesives are widely used in such fields as aircraft, space navigation articles, vehicles, ships, construction, engineering works, electricity, electronics, etc. Recently, for the purpose of reducing the weight in structural materials, plastics such as FRP represented by sheet molding compounds (abbreviated to SMC) and reactive injection molding materials (abbreviated to R-RIM) have been examined and utilized instead of conventional metal materials such as steel plates and aluminum sheets. However, these structural materials are used under severe conditions in these application fields, and adhesives should have properties capable of coping with these severe conditions.

However, when conventional adhesives are used for bonding of FRP-FRP, the adhesion strength and heat resistance are not satisfactory. Accordingly, it is desired to develop a structural adhesive showing a high bonding force to plastics not only at ordinary temperatures but also at high temperatures.

An adhesive composition similar to the adhesive composition of the present invention is proposed in U.S. Pat. No. 4,447,579. More specifically, there is disclosed an epoxy resin adhesive composition comprising an epoxy compound and a polyamide-amine having in the molecule a diene type rubber component as the curing agent. This polyamide amine is one obtained by reaction substantially equimolar amounts of a polymeric fatty acid and a diene type rubber component, and this composition is excellent in the bonding force at ordinary temperatures but the bonding force at high temperatures is not always satisfactory.

SUMMARY OF THE INVENTION

Research was conducted with a view to improving the bonding force at high temperatures, and it was found that if a polymeric fatty acid is not used but a free polyamine is present, the object of the present invention can be attained.

The present invention relates to an epoxy resin adhesive composition comprising (A) an epoxy compound having at least two epoxy groups on the average in the molecule and (B) a reaction product obtained by reacting an aliphatic polyamine compound represented by the general formula $H_2N(CH_2CH_2NH)_nH$, in which n is 2 to 5 with a diene type liquid rubber having a terminal carboxyl group and a molecular weight of 1,000 to 7,000 so that the molar ratio of the aliphatic polyamine compound to the diene type liquid rubber is in the range of from 5 to 100.

DESCRIPTION OF THE PREFERRED EMBODIMENTS

In the present invention, as the epoxy compound (A), there are preferably used a bisphenol A type epoxy resin, a bisphenol F type epoxy resin, a novolak-epoxy resin formed by reaction of a novolak resin with an epihalohydrin, a polyfunctional phenol type epoxy resin, a glycidylamine type polyfunctional epoxy resin, halogenation products thereof and mixtures of two or more of them. Furthermore, there may be used a diglycidyl ether compound obtained by reaction of resorcinol with an epihalohydrin, a glycidyl ester type epoxy resin, a polyglycol type epoxy resin, a cyclic aliphatic epoxy resin and a hydantoin type epoxy resin.

In the reaction product (B) (curing agent) of the aliphatic polyamine compound with the diene type liquid rubber, diethylene triamine, triethylene tetramine, tetraethylene pentamine and pentaethylene hexamine, which are represented by the general formula $H_2N(CH_2CH_2NH)_nH$, in which n is 2 to 5, may be used as the aliphatic polyamine compound, and triethylene tetramine and tetraethylene pentamine are especially preferred.

As the diene type liquid rubber having a terminal carboxyl group, there may be used liquid rubbers having a molecular weight of about 1,000 to about 7,000, such as carboxyl-terminated acrylonitrile-butadiene rubber, polybutadiene rubber, polyisoprene rubber and polychloroprene rubber. Acrylonitrile-butadiene rubber and polybutadiene rubber are especially preferred. As typical commercial products, there can be mentioned Hycar CTBN 1300X8, Hycar CTBN 1300X13 and Hycar CTB 2000X162 (each being supplied by B. F. Goodrich Co.), NISSO PB C-1000 and NISSO PB C-2000 (each being supplied by Nippon Soda Co.), and Poly BD R-45MA (supplied by Idemitsu Petrochemical Co.). It is preferred that the molar ratio of the polyamine to the diene type liquid rubber be 5 to 100, especially 10 to 30. If this molar ratio is smaller than 5, the reaction product is gelatinous and the compatibility with the epoxy compound is degraded. On the other hand, if the molar ratio exceeds 100, the viscosity is low and the difference of the viscosity between the reaction product and the epoxy compound is increased, with the result that the efficiency of the operation of mixing the reaction product with the epoxy compound is reduced. Furthermore, if a filler is added, the dispersibility of the filler is poor.

The reaction between the polyamine compound and the carboxyl-terminated diene type liquid rubber can be carried out at 110° to 200° C., preferably 130° to 180° C.

The mixing ratio of the curing agent (B) to the epoxy compound (A) is preferably 0.8 to 1.5 of the stoichiometric quantity calculated from the number of the epoxy groups of the component (A) and the number of the active hydrogen atoms of the component (B).

The adhesive composition of the present invention can be cured at room temperature, but in order to obtain a high adhesion strength more assuredly, it is preferred that the curing be performed at an elevated temperature of 60° to 150° C., especially 80° to 130° C. Furthermore, the curing should not inevitably be carried out in one stage, but the curing may be performed in at least two stages. For example, there may be adopted a method in which preliminary curing is carried out at a low temperature and then, curing is carried out at a higher temperature.

A filler or reinforcer, for example, a metal oxide such as titanium dioxide or alumina, a silicate, talc, a metal powder, a glass fiber, a carbon fiber or a polyamide fiber, a colorant such as a pigment or a dyestuff, a flame retardant and a leveling agent may be added to the adhesive composition of the present invention at an optional stage before the curing according to the intended use.

Various mixers may be used for mixing such additives into the component (A) (epoxy compound) or the component (B) (curing agent). For example, there can be used a mixing roll, a kneader and an extruder.

Epoxy type adhesives, polyurethane type adhesives and acrylic adhesives are marketed as the structural adhesive. Epoxy type adhesives are divided into one-pack and two-pack types, while polyurethane type adhesives and acrylic adhesives are of the two-pack type. When SMC described in the examples shown hereinafter was bonded by using these commercially available structural adhesives and the tensile shear strength was examined, it was found that the tensile shear strength was 25 to 110 Kg/cm$^2$ at ordinary temperature (25° C.) and 6 to 23 Kg/cm$^2$ at 100° C. In contrast, when the adhesive composition of the present invention was used, it was found that the tensile shear strength was 70 to 120 Kg/cm$^2$ at ordinary temperature and 40 to 85 Kg/cm$^2$ at 100° C.

When the bonding test was similarly carried out by using Verdsamid 140 (supplied by Henckel Japan), a typical known polyamide type hardner, it was found that the tensile shear strength was 38 Kg/cm$^2$ at 100° C.

Accordingly, it was confirmed that the adhesive of the present invention is excellent over the conventional adhesives.

In the examples, the tensile shear strength, viscosity, amine equivalent and active hydrogen equivalent were determined according to the following methods.

Method for Measurement of Tensile Shear Strength

The end portions of two test pieces having a length of 110 mm, a width of 25 mm and a thickness of 3 mm were bonded so that an adhesive layer having a length of 12.5 mm, a width of 25 mm and a thickness of 0.15 mm was formed. The tensile shear strength was measured at a pulling speed of 1 mm/min according to JIS K-6850.

Method for Measurement of Viscosity

The viscosity was measured at 25° C. by using an E type rotary viscometer.

Method for Measurement of Amine Equivalent

About 0.2 g of a sample of the curing agent (the weight of the sample is designated as "S") was placed in a beaker having a capacity of 100 ml. Then, 20 ml of a solution comprising 90% of phenol and 10% of methanol was added to the sample, and the mixture was sufficiently stirred and the sample was completely dissolved. Titration was carried out with 0.5N hydrochloric acid (factor F) by using Thymol Blue as the indicator. Supposing that the titration amount was A ml and the amount of the blank was B ml, the amine equivalent AEW (g/eq) was calculated according to the following equation:

$$AEW = \frac{1000 \times S}{(A - B) \times 0.5 \times F}$$

Method for Measurement of Active Hydrogen Equivalent

Supposing that the weight and number of moles of the polyamine used for the synthesis of the component (B) were respectively Wa (g) and Ma (mol), the weight and number of moles of the diene type rubber were respectively Wr (g) and Mr (mol), the number of nitrogen atoms per one polyamine molecular was N, and the number of functional groups per one diene type rubber molecular was f, the active hydrogen equivalent (AHE) was calculated according to the following equation:

$$AHE = \frac{Wr + Wa - 18.0\,Mr\,f}{(N + 2)\,Ma - 2\,f\,Mr}$$

The synthesis of the component (B) (curing agent) will now be described. All of "parts" and "%" are by weight unless otherwise indicated.

Curing Agent I

A four-neck flask equipped with a stirrer, a nitrogen gas-introducing pipe, a thermometer and a cooling tube was charged with 100 parts of Hycar CTBN 1300X8 (carboxyl equivalent=2000 g/eq) and 71.0 parts of tetraethylene pentamine, and the mixture was stirred at 180° C. for 1 hour in a nitrogen atmosphere to obtain a light yellow homogeneous liquid. The obtained liquid had an amine equivalent of 135 and a viscosity of 500 poises/25° C.

Curing Agent II

Curing agent II was synthesized in the same manner as adopted for the synthesis of curing agent I except that 31.2 parts of tetraethylene pentamine was used. The obtained product was a yellow viscous homogeneous liquid having a total amine equivalent of 161. The viscosity measured at 25° C. was higher than 10,000 poises.

Curing Agent III

Curing agent III was synthesized in the same manner as adopted for the synthesis of curing agent I except that 499 parts of tetraethylene pentamine was used. The obtained liquid product was heterogeneous and separated into two light yellow layers. The amine equivalent was 66 and the viscosity was 2 poises/25° C.

Curing Agent IV

Curing agent IV was synthesized in the same manner as adopted for the synthesis of curing agent I except that 38.2 parts of triethylene tetramine was used instead of tetraethylene pentamine. The obtained product was a homogeneous yellow liquid having an amine equivalent of 200 and a viscosity of 1710 poises/25° C.

Curing Agent V

Curing agent V was synthesized in the same manner as adopted for the synthesis of curing agent I except that 38.8 parts of diethylene triamine was used instead of tetraethylene pentamine and the reaction was carried out at 160° C. for 1.5 hours. The obtained product was a homogeneous liquid product having an amine equivalent of 163 and a viscosity of 465 poises/25° C.

Curing Agent VI

Curing Agent VI was synthesized in the same manner as adopted for the synthesis of curing agent I except that 100 parts of Hycar CTBN 1300X13 (carboxyl equivalent=1900 g/eq) was used instead of Hycar CTBN 1300X8 74.7 parts of tetraethylene pentamine was used. The obtained liquid product had an amine equivalent of 139 and a viscosity of 796 poises/25° C.

Curing Agent VII

Curing Agent VII was synthesized in the same manner as adopted for the synthesis of curing agent I except that Hycar CTB 2000X162 (carboxyl equivalent=2400 g/eq) and 45.9 parts of triethylene tetramine were used. The obtained liquid product was homogeneous and light yellow and had an amine equivalent of 170 and a viscosity of 390 poises/25° C.

Curing Agent VIII

Curing agent VIII was synthesized in the same manner as adopted for the synthesis of curing agent I except that 100 parts of Poly BD R-45MA (having an average molecular weight of 2800) was used instead of Hycar CTBN 1300X8 and 78.3 parts of triethylene tetramine was used. The obtained liquid was a heterogeneous liquid comprising an upper whitish red layer and a lower red layer and having an amine equivalent of 106 and a viscosity of 65 poises/25° C.

Curing Agent IX

Curing agent IX was synthesized in the same manner as adopted for the synthesis of curing agent I except that 100 parts of NISSO PB C-1000 (average molecular weight =1350) was used instead of Hycar CTBN 1300X8 and 162 parts of triethylene tetramine. The obtained product was a liquid comprising an upper light yellow layer and a lower yellow layer. The amine equivalent was 79 and the viscosity was 13 poises/25° C.

Curing Agent X

Curing agent X was synthesized in the same manner as adopted for the synthesis of curing agent I except that 295 parts of tetraethylene pentamine was used. The obtained liquid product was heterogeneous and comprised light yellow and yellow layers. The amine equivalent was 73 and the viscosity was 5 poises/25° C.

Curing Agent XI (Comparative Example 1)

Curing agent XI was synthesized in the same manner as adopted for the synthesis of curing agent I except that 23.9 parts of ethylene diamine was used instead of tetraethylene pentamine and the reaction was carried out at 130° C. for 7 hours. The obtained product was a light yellow homogeneous liquid having an amine equivalent of 214 and a viscosity of 298 poises/25° C.

Curing Agent XII (Comparative Example 2)

Curing agent XII was synthesized in the same manner as adopted for the synthesis of curing agent I except that 30.4 parts of hexamethylene diamine was used instead of tetraethylene pentamine. The obtained product was a dense yellow homogeneous liquid having an amine equivalent of 335 and a viscosity higher than 10000 poises as measured at 25° C.

Curing Agent XIII (Comparative Example 3)

Curing agent XIII was synthesized in the same manner as adopted for the synthesis of curing agent I except that 9.9 parts of tetraethylene pentamine was used and the reaction was carried out at 150° C. When 50 minutes passed from the start of the reaction, the viscosity was abruptly increased and stirring became impossible, and the reaction mixture became gelatinous.

Curing Agent XIV (Comparative Example 4)

Curing agent XIV was synthesized in the same manner as adopted for the synthesis of curing agent I except that 19.8 parts of tetraethylene pentamine was used and the reaction was carried out at 160° C. A dense yellow rubbery product having an amine equivalent of 300 and a viscosity higher than 10000 poises as measured at 25° C. was obtained.

Curing Agent XV (Comparative Example 5)

A four-neck flask equipped with the same members as equipped for the flask used for the synthesis of curing agent I was charged with 381 parts of a polymeric fatty acid comprising 7% of a monomer, 75% of a dimer and 18% of a trimer (Versadime 216 supplied by Henckel-Japan; acid value=191 to 197) (corresponding to a carboxyl equivalent of 1.32), 150 parts of tall oil fatty acid (Etol FA-X supplied by Arakawa Kagaku Kogyo; acid value=194) (corresponding to a carboxyl equivalent of 0.52) and 285 parts of tetraethylene pentamine (1.51 molar parts), and reaction was carried out at 220° C. for 2 hours in a nitrogen current. Then, the pressure was reduced to 300 mmHg and stirring was continued at the same temperature for 1 hour. The reaction mixture was cooled to about 40° C., and 100 parts of Hycar CTBN 1300X8 (corresponding to a carboxyl equivalent of 0.052) was added and stirring was conducted at 180° C. for 2 hours. Since the carboxyl group was present in an amount of 1.89 equivalents, tetraethylene pentamine was charged in an amount of 0.8 mole per equivalent of the carboxyl group. The so-obtained product was a brown liquid having an amine equivalent of 232 and a viscosity of 732 poises/25° C.

Curing Agent XVI (Comparative Example 6)

Curing agent XVI was synthesized in the same manner as adopted for the synthesis of curing agent XV except that 43.1 parts of Versadime 216 (carboxyl equivalent of 0.149), 17.0 parts of Etol FA-X (carboxyl equivalent of 0.059) and 49.2 parts of tetraethylene pentamine (0.260 molar part) were used so that the amount of tetraethylene pentamine was 1 mole per equivalent of the carboxyl group. The obtained product was a brown liquid having an amine equivalent of 228 and a viscosity of 750 poises/25° C.

EXAMPLE 1

Plates of SMC (glass fiber-incorporated unsaturated polyester supplied by Asahi Fiber Glass) having the surfaces wiped with a trichlene-impregnated gauze were bonded together according to the bonding test method described hereinbefore by using an adhesive formed by mixing 100 parts of Epikote 828 (bisphenol A type epoxy resin having an epoxy equivalent of 184 to 194 g/eq, supplied by Yuka Shell Epoxy Co.) with 40 parts of curing agent I, and curing was carried out at 100° C. for 1 hour. The tensile shear strength was measured at 25° C. and 100° C. The obtained results are shown in Table 1.

EXAMPLES 2 THROUGH 9 AND COMPARATIVE EXAMPLES 1 AND 2

The bonding operation was carried out in the same manner as described in Example 1 by using an adhesive formed by mixing 100 parts of Epikote 828 with a predetermined amount of a predetermined curing agent, and the tensile shear strength was measured. The kind and amount of the curing agent and the tensile shear strength are shown in Table 1.

TABLE 1

| Curing Agent No. | Curing Agent Amine/Diene Type Rubber Molar Ratio | Amount (parts) | Tensile Shear Strength (Kg/cm²) 25° C. | Tensile Shear Strength (Kg/cm²) 100° C. |
| --- | --- | --- | --- | --- |
| Example 1 | I | 15 | 40 | 104 | 73 |
| Example 2 | II | 6 | 90 | 108 | 52 |
| Example 3 | III | 100 | 20 | 110 | 76 |
| Example 4 | IV | 10 | 65 | 107 | 55 |
| Example 5 | V | 15 | 50 | 106 | 67 |
| Example 6 | VI | 15 | 40 | 106 | 77 |
| Example 7 | VII | 15 | 50 | 105 | 67 |
| Example 8 | VIII | 15 | 45 | 102 | 64 |
| Example 9 | IX | 15 | 28 | 97 | 76 |
| Comparative Example 1 | XI | 15 | 60 | 21 | 8 |
| Comparative Example 2 | XII | 10 | 88 | 92 | 34 |

EXAMPLES 10 THROUGH 12

The bonding property was evaluated by using an adhesive formed by mixing 100 parts of Epikote 828 with 40 parts of curing agent I in the same manner as described in Example 1 except that the curing temperature and time were changed as shown in Table 2. The obtained results are shown in Table 2.

TABLE 2

| Example No. | Curing Conditions Temperature (°C.) | Curing Conditions Time (minutes) | Tensile Shear Strength (Kg/cm²) 25° C. | Tensile Shear Strength (Kg/cm²) 100° C. |
| --- | --- | --- | --- | --- |
| 10 | 80 | 60 | 104 | 70 |
| 11 | 100 | 40 | 103 | 71 |
| 12 | 120 | 20 | 104 | 70 |

EXAMPLES 13 THROUGH 17

Epikote 807 (bisphenol F type epoxy resin having an epoxy equivalent of 170 g/eq, supplied by Yuka Shell Epoxy Co.), Epikote 152 (novolak type epoxy resin having an epoxy equivalent of 172 to 179 g/eq, supplied by Yuka Shell Epoxy Co.), Epikote 154 (novolak type epoxy resin having an epoxy equivalent of 176 to 182 g/eq, supplied by Yuka Shell Epoxy Co.) or Epikote 604 (glycidylamine type polyfunctional epoxy resin having an epoxy equivalent of 119 g/eq, supplied by Yuka Shell Epoxy Co.) singly or in the form of a mixture with Epikote 828 was mixed with a predetermined amount, shown in Table 3, of a predetermined curing agent shown in Table 3, and by using the resulting adhesive, the bonding property was evaluated in the same manner as described in Example 1. The obtained results are shown in Table 3.

TABLE 3

| Example No. | Epoxy Resin (parts) 828 | 807 | 152 | 154 | 604 | Curing Agent No. | Curing Agent Amount (parts) | Tensile Shear Strength (Kg/cm²) 25° C. | Tensile Shear Strength (Kg/cm²) 100° C. |
| --- | --- | --- | --- | --- | --- | --- | --- | --- | --- |
| 13 | | 100 | | | | I | 55 | 100 | 69 |
| 14 | | | | | 100 | IV | 95 | 112 | 67 |
| 15 | 50 | | 50 | | | IV | 65 | 105 | 54 |
| 16 | 70 | | | 30 | | IV | 60 | 117 | 72 |
| 17 | 50 | | | | 50 | I | 49 | 111 | 77 |

EXAMPLE 18

The bonding property was evaluated in the same manner as described in Example 1 except that an adhesive formed by mixing 100 parts of Epikote 828 with 65 parts of curing agent IV and 130 parts of aluminum silicate as the filler was used. The obtained results are shown in Table 4.

EXAMPLE 19

The bonding property was evaluated in the same manner as described in Example 1 except that an adhesive formed by mixing 50 parts of Epikote 828 with 50 parts of Epikote 604, 130 parts of rutile type titanium dioxide and 49 parts of curing agent I was used. The obtained results are shown in Table 4.

EXAMPLE 20

The bonding property was evaluated in the same manner as described in Example 1 except that an adhesive formed by mixing 80 parts of Epikote 828 with 20 parts of Epikote 931 (tetrafunctional phenol type epoxy resin having an epoxy equivalent of 198 g/eq, supplied by Yuka Shell Epoxy Co.) and 65 parts of curing agent IV was used. The obtained results are shown in Table 4.

TABLE 4

| Example No. | Epoxy Resin (parts) 828 | 604 | 931 | Filler (parts) | Curing Agent No. | Curing Agent Amount (parts) | Tensile Shear Strength (Kg/cm²) 25° C. | Tensile Shear Strength (Kg/cm²) 100° C. |
| --- | --- | --- | --- | --- | --- | --- | --- | --- |
| 18 | 100 | | | aluminum silicate (130) | IV | 65 | 100 | 55 |
| 19 | 50 | 50 | | titanium dioxide (130) | I | 49 | 109 | 71 |
| 20 | 80 | | 20 | — | IV | 65 | 100 | 57 |

EXAMPLE 21 AND COMPARATIVE EXAMPLES 3 THROUGH 6

The bonding property was evaluated in the same manner as described in Example 1 except that an adhesive formed by mixing 100 parts of Epikote 828 with a predetermined amount of a predetermined curing agent was used. The kind and amount of the curing agent and the tensile shear strength are shown in Table 5. The amounts of the polymeric fatty acid, tall oil fatty acid and diene type rubber used for the synthesis of the curing agent, the corresponding carboxyl group number, the amount of the amine and the corresponding mole number of the amine are shown in Table 6 together with the corresponding data of Example 1.

TABLE 5

| | Curing Agent | | | Tensile Shear Strength (Kg/cm$^2$) | |
|---|---|---|---|---|---|
| | Curing Agent No. | Amine/Diene Type Rubber Molar Ratio | Amount (parts) | 25° C. | 100° C. |
| Example 1 | I | 15 | 40 | 104 | 73 |
| Example 21 | X | 60 | 20 | 108 | 80 |
| Comparative Example 3 | XIII | 2 | — | bonding was impossible because there was no compatibility between curing agent and epoxy resin | |
| Comparative Example 4 | XIV | 4 | 135 | 103 | 33 |
| Comparative Example 5 | XV | — | 75 | 102 | 33 |
| Comparative Example 6 | XVI | — | 75 | 100 | 22 |

TABLE 6

| Curing Agent No. | Polymeric Fatty Acid | Tall Oil Fatty Acid | Hycar CTBN 1300 × 8 | Total Carboxyl Carboxyl Equivalent | Tetraethylene Pentamine | Remarks |
|---|---|---|---|---|---|---|
| I | — | — | 100 parts (0.052 carboxyl equivalent) | 0.052 | 71.0 parts (0.375 molar parts) | amine/diene type rubber molar ratio = 15 |
| X | — | — | 100 parts (0.052 carboxyl equivalent) | 0.052 | 295 parts (1.558 molar parts) | amine/diene type rubber molar ratio = 60 |
| XIII | — | — | 100 parts (0.052 carboxyl equivalent) | 0.052 | 9.9 parts (0.052 molar parts) | amine/diene type rubber molar ratio = 2 |
| XIV | — | — | 100 parts (0.052 carboxyl equivalent) | 0.052 | 19.8 parts (0.105 molar parts) | amine/diene type rubber molar ratio = 4 |
| XV | 381 parts (1.317 carboxyl equivalent) | 150 parts (0.519 carboxyl equivalent) | 100 parts (0.052 carboxyl equivalent) | 1.888 | 285 parts (1.506 molar parts) | |
| XVI | 43.1 parts (0.149 carboxyl equivalent) | 17.0 parts (0.059 carboxyl equivalent) | 100 parts (0.052 carboxyl equivalent) | 0.260 | 49.2 parts (0.260 molar parts) | |

EXAMPLE 22

The bonding property was evaluated in the same manner as described in Example 1, except that as the substrate to be bonded, a plate of a polyurethane-RIM (BIJULE RIM supplied by Sumitomo Byer Urethane) was used.

The tensile shear strengths at 25° C. and 100° C. were 63 kg/cm$^2$ and 30 kg/cm$^2$, respectively. The bonded plate was broken in the body thereof but not at the bonded surface.

EXAMPLE 23

The bonding property was evaluated in the same manner as described in Example 1, except that as the substrate to be bonded, a plate of an ABS resin (CYCO-RAC supplied by Ube Cycon) was used.

The tensile shear strengths at 25° C. and 100° C. were 52 kg/cm$^2$ and 35 kg/cm$^2$, respectively. The bonded plate was broken in the body thereof but not at the bonded surface.

We claim:

1. An epoxy resin adhesive composition comprising (A) an epoxy compound having at least two epoxy groups on the average in the molecule and (B) a curing amount of the reaction product obtained by reacting an aliphatic polyamine compound represented by the general formula $H_2N(CH_2CH_2NH)_nH$, in which n is 2 to 5, with a diene type liquid rubber having a terminal carboxyl group and a molecular weight of 1,000 to 7,000 so that the molar ratio of the aliphatic polyamine compound to the diene type liquid rubber is in the range of from 5 to 100, said diene type liquid rubber component constituting 2.8% to 36.1% of the weight of said composition.

2. An epoxy resin adhesive composition as set forth in claim 1, wherein the epoxy compound (A) is selected from a bisphenol A type epoxy resin, a bisphenol F type epoxy resin, a novolak-epoxy resin formed by reaction of a novolak resin with an epihalohydrin, a polyfunctional phenol type epoxy resin, a glycidylamine type polyfunctional epoxy resin, halogenation products thereof and mixtures of two or more of them.

3. An epoxy resin adhesive composition as set forth in claim 1, wherein the aliphatic polyamine compound is selected from diethylene triamine, triethylene tetramine, tetraethylene pentamine and pentaethylene hexamine.

4. An epoxy resin adhesive composition as set forth in claim 3, in which the aliphatic polyamine compound is selected from triethylene tetramine and tetraethylene pentamine.

5. An epoxy resin adhesive composition as set forth in claim 1, wherein the diene type liquid rubber is selected from liquid carboxyl-terminated acrylonitrilebutadiene, polybutadiene, polyisoprene and polychloroprene rubbers.

6. An epoxy resin adhesive composition as set forth in claim 1, wherein the molar ratio of the aliphatic polyamine compound to the diene type liquid rubber in the component (B) is in the range of from 10 to 30.

7. An epoxy resin adhesive composition as set forth in claim 1, wherein the mixing ratio of the component (B) to the epoxy compound (A) is 0.8 to 1.5 of the stoichiometric quantity calculated from the number of the epoxy groups of the component (A) and the number of the active hydrogen atoms of the component (B).

* * * * *